UNITED STATES PATENT OFFICE.

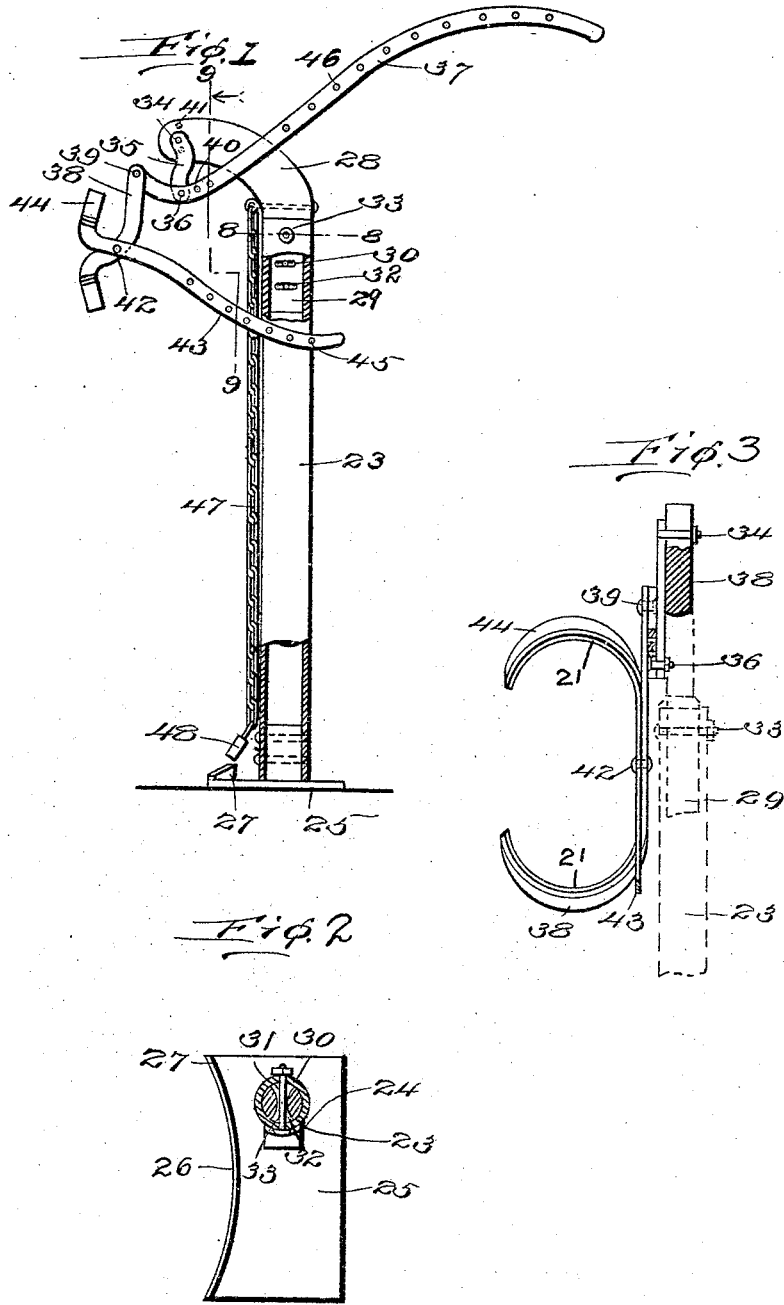

JEREMIAH A. GUMM, OF PHILADELPHIA, PENNSYLVANIA.

JACK AND LOCKING MEANS THEREFOR.

944,962.

Specification of Letters Patent. Patented Dec. 28, 1909.

Application filed October 17, 1908. Serial No. 458,280.

*To all whom it may concern:*

Be it known that I, JEREMIAH A. GUMM, citizen of the United States, residing at Philadelphia, in the county of Philadelphia and State of Pennsylvania, have invented certain new and useful Improvements in Jacks and Locking Means Therefor; and I do hereby declare the following to be a full, clear, and exact description of the invention, such as will enable others skilled in the art to which it appertains to make and use the same.

This invention relates to improvements in lifting jacks, and particularly to jacks for lifting and supporting automobiles, and has for an object the provision of an improved jack and associated therewith means for locking the jack and automobile after the jack has been operated for raising the automobile.

A further object of the invention is the construction of a jack formed with a support arranged for receiving a swinging pivotally mounted lever having pivotally connected thereto the support for the wheel of an automobile, together with a pivotally mounted lever that may be brought into contact with the part of the automobile being lifted, and then locked with the same means that locks the lever mechanism against movement.

A still further object of the invention is the construction of a jack that may be used for elevating and continuously supporting an automobile in the ordinary manner of a jack, or be used in the ordinary manner of a jack and in addition as a lock for preventing the removal of the automobile by an unauthorized person.

With these and other objects in view the invention comprises certain novel constructions, combinations and arrangement of parts as will be hereinafter more fully described and claimed.

In the accompanying drawings: Figure 1 is a side elevation with certain parts broken away of my preferred form of jack. Fig. 2 is a section through Fig. 1 on line 8—8. Fig. 3 is an enlarged detail fragmentary view through Fig. 1 approximately on line 9—9.

In the construction of jacks and particularly jacks for elevating and holding in an elevated position automobiles it is desirable not only to provide efficient means for elevating and holding elevated the automobile, but also means combined therewith for either locking the jack against movement after having elevated the automobile, or locking the jack directly to the automobile so that the automobile can not be moved by an unauthorized person. In the construction of the present invention I have aimed to accomplish these and other desirable results by the provision of a jack that may be arranged with a standard or support of any desired kind.

To the support 28 is secured a swinging link 35, which in turn has pivotally connected therewith an operating lever 37 which supports, at its inner end, a substantially hook shaped member 38 which is designed to pass beneath the hub of the automobile and raise the wheel, and when there is a jack for each wheel the entire machine will be raised. Connected with the hook shaped member 38 is a pivotally mounted lever 43 formed with an arc-shaped end 44 that is adapted to partially encircle the hub of the automobile wheel, and after the lever 37 has been forced downward for elevating the wheel the pivotally mounted lever 43 is locked to the elevating lever 37 by means of a lock bolt passing through both of the levers 43 and 37 for locking the same together.

The jack may be used for elevating the wheels of any automobile, but when it is desired to use the locking lever 43 the jack may be used only with machines in which there is a circular depression upon the outer end of the hub so as to cause the hook shaped supporting member 38 to engage one part of the depression or groove and the locking member 43 the other part. In case the jack is used with a machine that has not this depression or groove, a chain 47, secured to the hook shaped member 28 may be used by passing one end of the same around one of the spokes of the wheel and then locking the chain to the elevating lever 37 or to the jack at any desired point.

In using the jack with a machine it will be observed that the support for the operating lever may be swung on a horizontal plane for permitting the further engagement with the automobile.

In order that the invention may be more fully understood a preferred embodiment of the same is shown in the accompanying drawings in which—

23 indicates a standard of any desired height, preferably tubular in construction to which is secured by hinge 24 a base 25 that is formed with an arc shaped recess 26 and a rim 27 that is formed also on the arc of a circle that is of greater height substantially centrally of the base and tapering downward in the opposite direction until the same nearly comes flush with the top of the base. This forms a fender or stop for preventing the base from sliding under the tire when in use, and by the arc shaped construction permits the jack to be moved up as close to the hub as may be desired.

Pivotally secured to the upper end of standard 23 is an overhanging or hook shaped member 28 that is partly rotatable in a horizontal plane and is formed with a reduced portion 29 that fits into member 23. The reduced portion 29 is provided with a plurality of apertures 30 which are widened at 31 and 32 for permitting a partial rotary movement of the hook shaped member 28 above set forth and yet accommodating bolt or pin 33 which passes therethrough and also through standard 23 for holding the hook shaped member 28 in position. Bolt 33 is adapted to be tightened up firmly against standard 23 for positively holding hook shaped member 28 in position, but by the construction of the apertures 30 the hook-shaped member 28 may be partially rotated on a horizontal plane without moving the standard 23.

Pivotally connected to the end of hook shaped member 38 by pin 39 is an elevating lever 37 which in turn is pivotally connected to a link 35 by pin 36. The inner end of the elevating lever 37 being thus pivotally connected to a hook 38 by a pin 39 any movement of lever 37 will be communicated to hook 38 by raising or lowering the same. A plurality of apertures 40 are provided in lever 37 for permitting an adjustment of pin 36 so as to admit of raising hook 38 to a greater or less height. In order to accommodate various sized hubs a plurality of apertures 21 are arranged in hook shaped member 28 for varying the height of link 35.

Pivotally secured by rivets 42 to hook 38 is a locking lever 43 that has its outer end 44 formed on the arc of a circle for partially encircling the hub of an automobile wheel so that after the hook 38 has been raised together with the wheel of an automobile locking lever 43 may be raised and end 44 pressed downward against the hub. After the end 44 has been pressed tightly against the hub the bolt of the lock is passed through one of the apertures 45 in lever 43 and also one of the apertures 46 in lever 37 so as to lock the two levers together and thus prevent the removal of the jacks from the wheel. Preferably lever 37 is depressed until pin 39 is in alinement with pin 34 and the end of pin 36 is beneath hook 38. This is to prevent the removal of any of the pivotal points. In addition the lever 37 is adapted to come opposite pin 33 so that the same cannot be removed, or if desired pin 33 may be riveted on its end for preventing the removal of the tension nut.

In addition to the locking lever 43 a chain 47 may be used that is adapted to pass around one of the spokes of the wheel and then be secured by lock 48 to lever 37.

In this structure a leather or any suitable lining may be arranged within the end of hook 38 that engages the automobile and also end 44 so as to prevent any scarring of the hub.

The invention has been particularly described in regard to use with an automobile, but it will be evident that any kind of a wheel may be elevated thereby and also the jack may be used for other purposes, although it is preferably used in elevating wheels and locking the same so as to prevent any unauthorized person from using the vehicle. A special advantage is presented in the provision of the locking levers in that the same afford means for positively locking the elevating lever in position and thus preventing accidental lowering of the wheel, and at the same time positively preventing the removal of the jack from the wheel.

What I claim is:

1. In a jack, a standard, an elevating lever, means for pivotally connecting said elevating lever to said standard in such a manner as to permit a swinging and pivotal movement of said elevating lever, and an article supporting member secured to one end of said elevating lever.

2. In a jack, a standard, an elevating lever swingingly and pivotally connected with said jack, a hook-shaped member pivotally connected to said lever, and a locking means connected to said hook-shaped member for locking said first mentioned lever against movement.

3. In a jack, a standard, a link pivotally connected to said standard, an elevating lever connected to said link, a hook-shaped member connected to one end of said elevating lever, and a locking lever coacting with said hook-shaped member and with said elevating lever for locking said elevating lever and said hook-shaped member to the article supported by the same and against return movement.

4. In a jack for automobiles and the like, a standard, a lever swingingly connected with said standard, a hook-shaped member pivotally connected with said lever for engaging the hub of said automobile for elevating the same when said lever is depressed, a locking lever pivotally connected with said hook-shaped member and formed with one end adapted to partially encircle the hub of said automobile wheel and with lock receiving apertures in the opposite end, and means for locking said elevating lever and said locking lever together.

5. In a jack for automobile wheels and the like, a standard, a swinging adjustable link, an elevating lever adjustably secured to said link, a hook-shaped member supported by said link for engaging the hub of said automobile wheel, a locking lever pivotally connected to said hook-shaped member and arranged to have one end partially encircle the hub of said automobile wheel and the opposite end with a plurality of apertures for receiving a locking member, and means passing through the apertures in said locking lever and said elevating lever for locking the lever together and for preventing the removal of said jack from said wheel.

6. In a jack for automobile wheels and the like, a standard, a link pivotally secured to said standard, an elevating lever pivotally connected to said link, a hook-shaped member connected to said lever, the pivotal point of said hook-shaped member and the pivotal point of said link being so arranged that when said elevating lever is depressed all of said pivotal points will be in alinement for preventing the removal of any of the pivotal members, and means for positively locking said elevating lever against movement after the same has been depressed.

7. In a jack, a standard, elevating means pivotally secured to said standard, locking means for holding in a locked position said elevating means, and a support hinged to the lower end of said standard.

8. In a jack, a standard, a horizontally rotating hook shaped member mounted on said support, a swingingly supported elevating lever connected with said horizontally rotating hook shaped member, an article engaging means secured to said elevating lever whereby when said elevating lever is depressed said article will be elevated, and locking means coacting with said article supporting means and with said elevating lever for positively holding said elevating lever against movement when in a depressed position and for holding the article elevated from removal.

9. In a jack, a standard, a hook shaped member pivotally mounted in said standard and formed with a reduced portion, said reduced portion being formed with apertures flared at each end, a securing means passing through said standard and said apertures for preventing the removal of said hook shaped member, the shape of the apertures in said reduced portion permitting a partial horizontal rotary movement of said hook shaped member, and an article elevating means pivotally secured to said hook shaped member.

10. In a jack, a standard, a hook shaped member formed with a reduced portion mounted in said standard and formed with a plurality of apertures passing therethrough having flared ends, means passing through said standard and through said apertures for securing said hook shaped member to said standard but permitting a partial rotary movement of said hook shaped member, a link pivotally secured to said hook shaped member, an elevating lever pivotally connected with said link, an article engaging hook pivotally connected to said lever whereby when the end of said lever is moved downward the article engaged by said hook will be moved upward, a locking lever pivotally secured to said hook and adapted to engage the article supported by said hook for preventing the article being removed therefrom, and means for locking said elevating lever when said elevating lever is in a lowered position.

In testimony whereof I affix my signature in presence of two witnesess.

JEREMIAH A. GUMM.

Witnesses:
 JOHN L. FLETCHER,
 A. L. KITCHIN.